Figure 1:
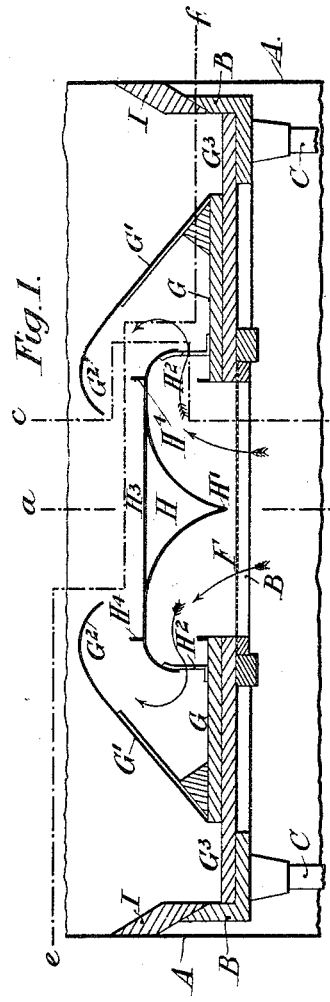

(No Model.) 4 Sheets—Sheet 1.

T. & G. M. PARKINSON.
SIEVE.

No. 437,718. Patented Oct. 7, 1890.

Witnesses:
H. S. McArthur
Alk N. Dobson

Inventors:
T. Parkinson
G. M. Parkinson
By Foster & Freeman Atty's.

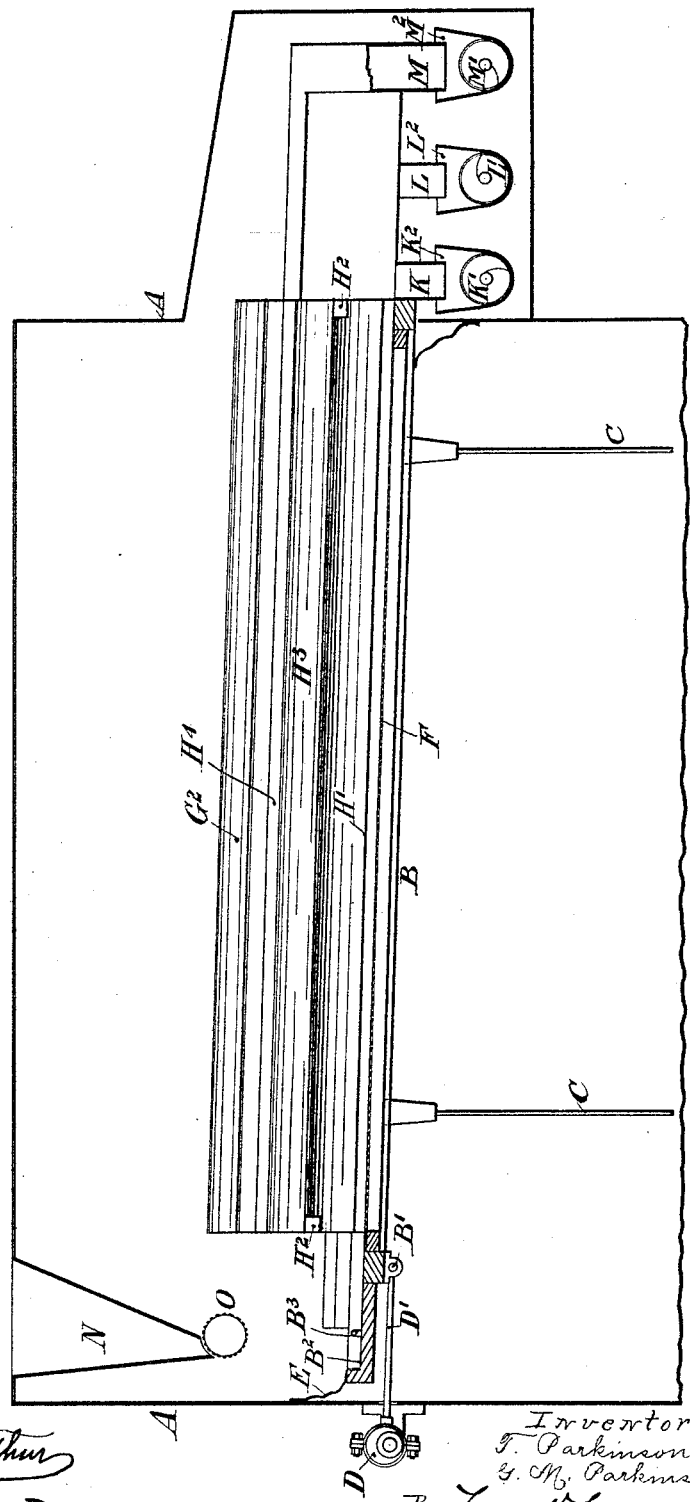

(No Model.) 4 Sheets—Sheet 3.
T. & G. M. PARKINSON.
SIEVE.
No. 437,718. Patented Oct. 7, 1890.
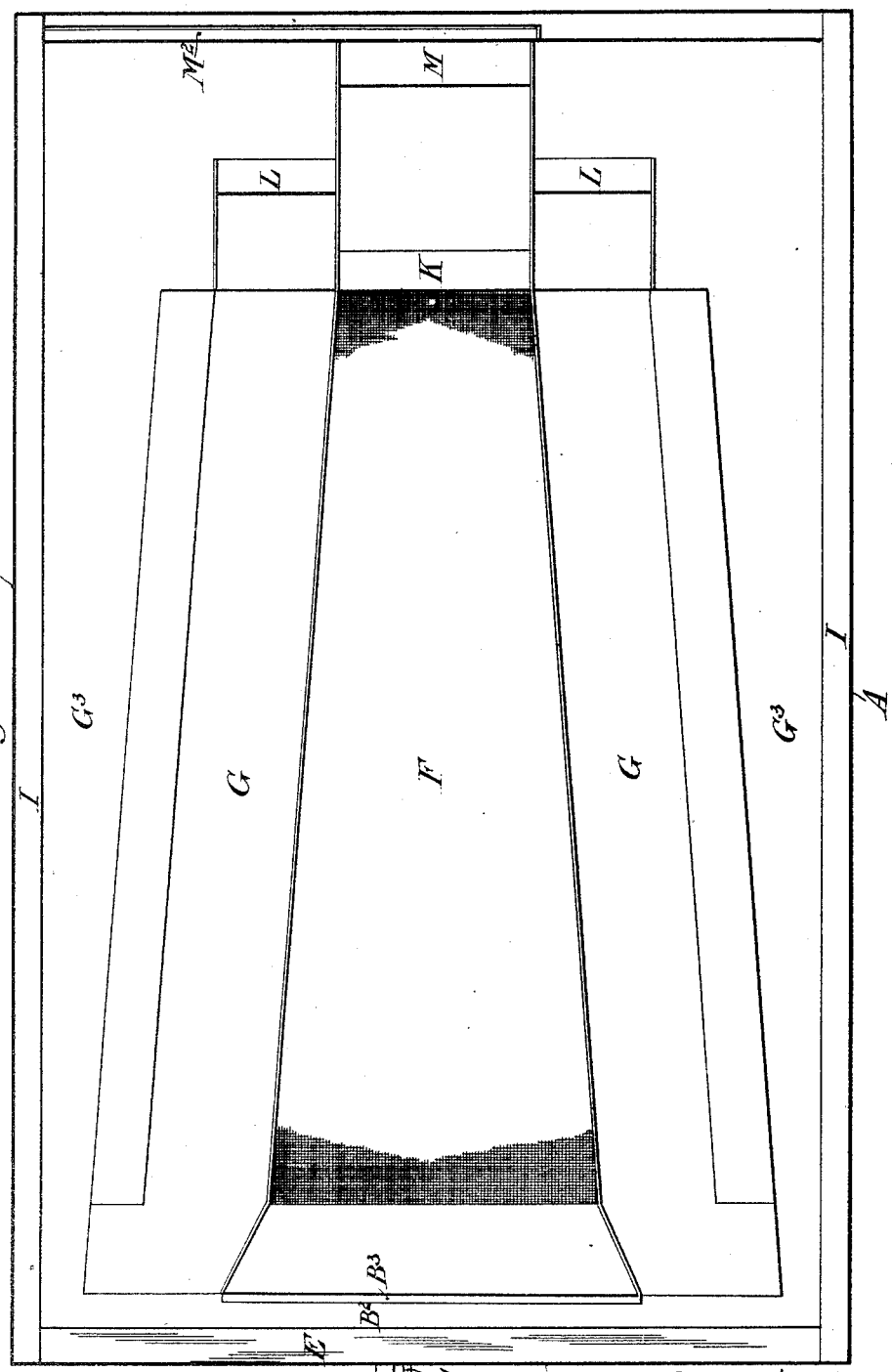

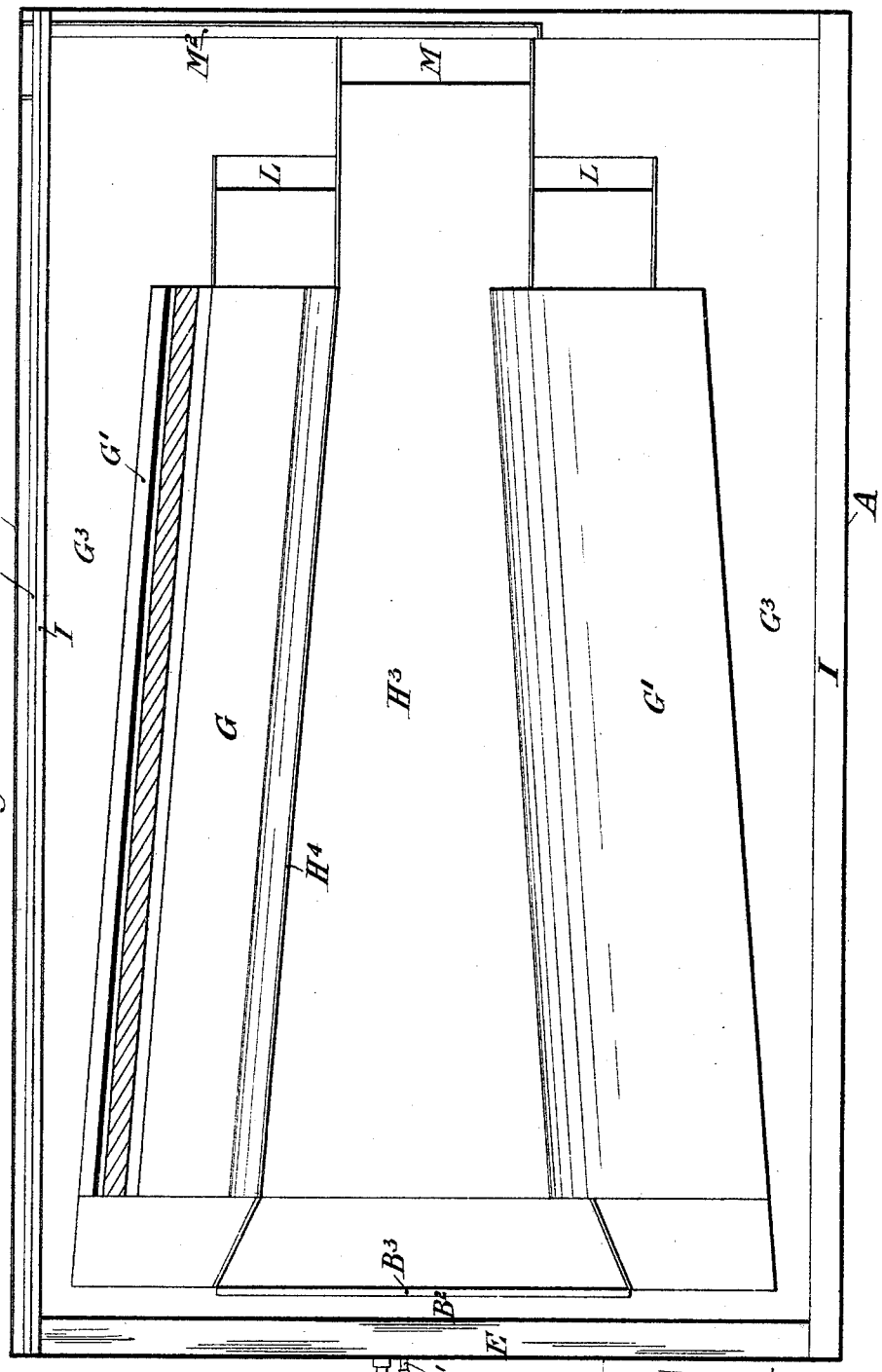

UNITED STATES PATENT OFFICE.

TOM PARKINSON AND GEORGE MARSDEN PARKINSON, OF DONCASTER, ENGLAND.

SIEVE.

SPECIFICATION forming part of Letters Patent No. 437,718, dated October 7, 1890.

Application filed July 16, 1890. Serial No. 358,903. (No model.) Patented in England March 17, 1890, No. 4,176.

*To all whom it may concern:*

Be it known that we, TOM PARKINSON and GEORGE MARSDEN PARKINSON, subjects of the Queen of England, residing at Doncaster, in England, have invented certain new and useful Improvements in or relating to Sieves Applicable for Purifying, Grading, or Separating Grain and other Substances, (for which we have made application for Letters Patent of Great Britain, No. 4,176, dated March 17, 1890,) of which the following is a specification.

This invention relates to improvements in the construction and working of oscillating or otherwise moving sieves used for purifying, grading, or separating middlings, grain, or other substances, and may be briefly described as follows:

Instead of using the whole surface of the tray or sieve for the purpose of purification or sifting of the material under treatment a narrow longitudinal channel suffices for our purpose. This runs the length of the tray, and may be tapered in width toward the delivery or tail end, so that the quantity of material sifted through at the head end may not diminish the thickness of the stream and thus offer an unequal resistance to the pressure of wind which may be blown or exhausted through it. The remainder of the tray-surface we prefer to make up of solid or wind proof sections. These dead-spaces form expansion room for the air, causing it to deposit the solid matter it may in its passage through the sieve have lifted from the material under treatment and to escape free from such solid matter to the outlet. Over the sieve-channel, and running the entire length of it, is a cowl or hood or deflecting-board, which expedites the deposit of the material onto the dead parts before referred to. The wind coming up the narrow channel strikes this board and is at once deflected to either or both sides, and the solid particles, being thus thrown out of the influence of the air-current, settle and are removed by the motion of the tray carrying them to the tail end, or by other suitable means if the deposit or dead portions of the tray do not partake of the shaking motion of the sieve portion. The upper sides of the deflecting-boards may form a channel for the depositing and carrying off of any particles of light dust or flour which may by reason of their small specific gravity have floated above the under side of them. The sieves must oscillate or shake in some manner to insure the travel and separation of the material; but the dead parts may either be part of the sieve portion, shaking with it, or can be independent, having special devices for clearing off the deposited material.

Figure 2:
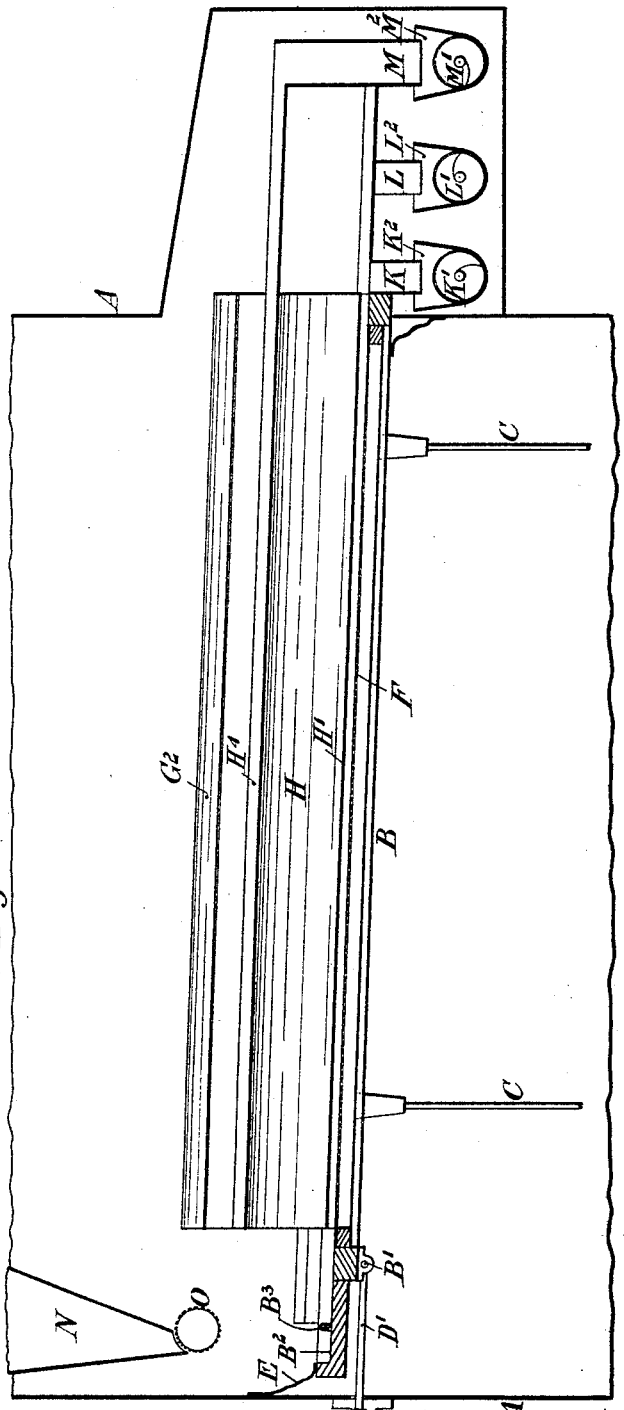

In the accompanying drawings, Figure 1 is a cross-section of the complete apparatus. Fig. 2 is a longitudinal vertical section upon lines $a\,b$ of Fig. 1. Fig. 3 is a longitudinal vertical section on line $c\,d$ of Fig. 1. Fig. 4 is a plan of the sieve, with the deflectors removed; and Fig. 5 is a plan upon line $e\,f$ of Fig. 1.

Like letters represent like parts throughout the drawings.

The whole apparatus is inclosed in a case A, the movable sieve B being preferably carried upon vertical springs C of flexible wood or steel, so as to permit of the requisite motion being imparted to the sieve. This may be done in any convenient manner; but in the drawings it is shown as due to an eccentric D, whose rod D' is jointed to the sieve at B', tight joints being made between the moving sieve and the stationary casing by means of cloth or equivalent joint-pieces E, secured to both, but permitting of the requisite free motion of the sieve.

F is the silk, and G are the solid or dead portions or sections of the sieve, provided with the deflecting-wings G'. Above the silk F and underneath the deflecting-wings G' is a longitudinal hood or cowl H, preferably extending in the middle to a point H' and curving right and left, so as to deflect the particles of dust, &c., onto the dead-spaces G at each side of it. This cowl H is carried upon the sieve, and it may be supported in any convenient manner, as by the bracket $H^2$. The upper portion or back $H^3$ of the cowl H is used as a dead-space, for which purpose short walls or edges $H^4$ are provided, the particles carried beyond the two dead-spaces G, already referred to, being deflected by the curved edges $G^2$, so as to fall onto the space $H^3$. If desired, beyond this action a further division can be made by employing an additional cowl above the wings G' to deflect the dust onto the outer spaces $G^3$. All this will be well understood by reference to Fig. 1 of the accompanying drawings.

I are longitudinal frames secured to the sides of the casing, preferably beveled, as shown in Fig. 1, and against which the similarly-beveled edges of the sieve B are adapted to bear, so as to make a practically wind-tight joint between the two.

K, L, and M are three separate drop channels or chutes, each provided with its separate worm conveyer K' L' M', so that the matters falling to these respective conveyers are carried off separately. The channels K L M deliver into the open troughs $K^2$ $L^2$ $M^2$, which carry the worm conveyers, in such a manner that the movement of these channels, which are secured to the moving sieve, will not interfere with the proper delivery of their contents to the worm conveyers.

N is a feed-hopper, and O is a feed-roller, and the operation of this apparatus is as follows: The material to be operated upon is fed into the hopper N, and by the feed-roller O delivered onto the higher end of the sieve at $B^2$, where it collects until it has risen sufficiently high to overtop the small ledge $B^3$, by which means an even distribution is secured. As the shaking proceeds the middlings, as will be seen by reference to Fig. 2, pass down on the silk surface of the sieve. Here it is attacked by the wind which passes through the silk and carries up with it the dust and lighter particles, which are distributed in the manner presently to be described, the smaller pure middlings dressing through the silk and the larger clean middlings remaining still on the silk and running down to the lower end, where they fall over into the channels K, by which they pass into the trough $K^2$ and to the worm conveyer K'. The dust, &c., carried up by the current of air strikes against the deflecting plate or cowl H, where the heavier portions drop onto the dead portions G. The matter collected in the channel G travels down that channel to the lower end and passes into the channel L, and so by the trough $L^2$ to the worm conveyer L', where they are carried off by the conveyer. The air, which still retains the lighter particles of dust and similar impurities, escapes between the wings G' and top of cowl H and deposits the remaining impurities into the channel $H^3$, from which it passes to the channel M, trough $M^2$, and worm conveyer M'.

We claim—

1. In an apparatus such as described, a sieve having a central sieving-space, such as F, side dead-spaces, such as G, and a longitudinal cowl, such as H, with curved deflecting-faces joining centrally at H' and curving outward and downward so as to direct the current of air and impurities onto the dead-spaces G, substantially as described, and illustrated in the accompanying drawings.

2. In an apparatus such as described, a cowl or deflector, such as H, having two centrally-joined curved deflecting-faces on its under side, and a collecting-space, such as $H^3$, on its upper side, substantially as described and illustrated in Fig. 1 of the accompanying drawings.

3. In an apparatus such as described, the combination, with a cowl or deflector, such as H, of two deflectors, such as G', curving downward at $G^2$, so as to deflect the impurities into the channel $H^3$, both deflectors H and G' being secured to and moving with the sieve, the whole substantially as described and illustrated in the accompanying drawings.

4. In an apparatus such as described, the combination, with the cowl H and deflectors G', of the sieve tapering in width toward the delivery end, substantially as described.

In testimony whereof we have hereto set our hands in the presence of the two subscribing witnesses.

TOM PARKINSON.
GEORGE MARSDEN PARKINSON.

Witnesses:
ARTHUR BOWMAN BROWN,
    42 *High Street, Doncaster*,
ROBERT NEWTON TATE,
    5 *Oxford Place, Doncaster*,
*Clerks to Messrs. Parkin & Co., Solicitors, Doncaster.*